United States Patent [19]

Jones

[11] 4,206,809

[45] Jun. 10, 1980

[54] SLUG DESIGN IN MICELLAR-POLYMER FLOODING

[75] Inventor: Stanley C. Jones, Littleton, Colo.

[73] Assignee: Marathon Oil Company, Findlay, Ohio

[21] Appl. No.: 956,936

[22] Filed: Nov. 2, 1978

[51] Int. Cl.$^2$ .................. E21B 43/22; E21B 47/00
[52] U.S. Cl. ................................ 166/252; 166/274
[58] Field of Search ............... 166/252, 273, 274, 275

[56] References Cited

U.S. PATENT DOCUMENTS

| | | | |
|---|---|---|---|
| Re. 27,198 | 10/1971 | Gogarty | 166/252 |
| 3,467,190 | 9/1969 | Dunlap et al. | 166/252 |
| 3,508,611 | 4/1970 | Davis, Jr. et al. | 166/252 |
| 3,643,738 | 2/1972 | Dreher et al. | 166/252 |
| 3,885,628 | 5/1975 | Reed et al. | 166/252 |
| 3,938,591 | 2/1976 | Ossip et al. | 166/252 X |
| 3,976,582 | 8/1976 | Douglas et al. | 252/8.55 D |
| 3,981,361 | 9/1976 | Healy | 166/252 |
| 4,013,125 | 3/1977 | Plummer et al. | 166/252 X |
| 4,079,785 | 3/1978 | Hessert et al. | 166/252 X |
| 4,125,156 | 11/1978 | Glinsmann | 166/252 |

*Primary Examiner*—Stephen J. Novosad
*Assistant Examiner*—George A. Suchfield
*Attorney, Agent, or Firm*—Joseph C. Herring; Jack L. Hummel

[57] ABSTRACT

Micellar-polymer systems for use in oil recovery are designed by examining an oil-bearing reservoir to determine its suitability for secondary-type oil recovery operations and to determine whether secondary-type oil recovery is, in fact, economic. If predetermined criteria of reservoir configuration and economic yield are met, a suite of suitable micellar dispersions is prepared from components which are both available and economic. The interfacial tension between each of the micellar dispersions, such as the preferred microemulsions and reservoir fluids, is then optionally determined along with mobility of the micellar dispersions and stability of the micellar dispersions on contact with the fluids in the reservoir and the reservoir material simulating the reservoir. Filterability determinations are made to screen out any micellar dispersion which might plug the reservoir. Core floods are then run using a large slug (50% to about 150% PV) in reservoir simulation material with each micellar dispersion passing the screening to eliminate micellar dispersions which displace oil poorly and to determine displacement behavior. The slugs which are not eliminated by the large slug screening are then used with drive fluids of controlled mobility to flood cores in very small amounts, i.e. 1–3% PV, to establish the oil-recovery to slug-size ratio of each of the suite of micellar dispersions passing the initial screening. Intermediate slug size (5–15% PV) floods are then carried out in reservoir simulation material with the compositions having the highest ratios to establish the economically optimum micellar dispersion-drive fluid combination.

32 Claims, 5 Drawing Figures

SLUG DESIGN IN MICELLAR-POLYMER FLOODING

BACKGROUND OF THE INVENTION

Micellar-polymer flooding is well known. The cost is substantial and poor slug design can cause failure. Many publications relate to the various aspects of oil displacement with micellar systems. Exemplary of the literature in this area are the following references.

C. L. Stegemeier, in the chapter, "Oil Entrapment and Mobilization in Porous Media" in the book, *Improved Oil Recovery by Surfactant Polymer Flooding*, edited by D. O. Shaw, and R. S. Schechter, Academic Press, New York (1977) teaches that the mobilization recovery of tertiary oil is affected, at the microscopic level, by:

1. geometry of the pore network;
2. fluid-fluid properties such as interfacial tension, density difference, bulk viscosity ratio, and phase behavior;
3. fluid-rock properties, including wettability, ion exchange, and adsorption; and
4. applied pressure gradient and gravity.

The article also notes that several mechanisms of oil displacement can be significant in micellar-polymer flooding. Opposing viscous and capillary forces are taught to be the controlling mechanism for simple two-phase systems. Other operating mechanisms include interphase mass transfer, interface aging effects, wettability changes and emulsification. At the microscopic level, variations in permeability, the presence of clays, the type of crude, etc. affect slug design.

Composition distinguishes the three types of micellar systems used in oil recovery. U.S. Pat. No. 1,823,439, issued to M. De Groot and U.S. Pat. No. 3,006,411 issued to O. C. Holbrook teach the use of dilute aqueous solutions of surfactants in oil recovery. This type of aqueous system may also contain small amounts of oil which may be no more than impurities in the surfactants and/or salts. U.S. Pat. No. 3,082,822, issued to W. B. Gogarty et al and U.S. Pat. No. 3,163,214 issued to A. K. Csaszar, teach the use of "soluble oils" which may contain varying amounts of water but which are mainly hydrocarbon and surfactant. The use of higher surfactant concentration microemulsions is taught in U.S. Pat. No. 3,254,714 to W. B. Gogarty et al, U.S. Pat. No. 3,506,070, U.S. Pat. No. 3,613,787 issued to S. C. Jones, and many others listed below. The microemulsions contain hydrocarbon, water, surfactant, and salts and may also contain cosurfactant.

There are major differences in opinion expressed within the literature regarding the need for phase stability in higher surfactant system floods. W. B. Gogarty et al teach that microemulsion integrity should be maintained as great a distance as possible during the flooding operation while R. N. Healy et al, Soc. Pet. Eng. J., 14, 491 (1974) and R. N. Healy et al, Soc. Pet. Eng. J., 15, 87 (1975) suggest that the microemulsion breaks down almost immediately and phase stability is substantially inconsequential.

The art contains many discussions of compositional factors. For example, R. N. Healy et al, Soc. Pet. Eng. J., 14, 491 (1974); Soc. Pet. Eng. J., 16, 147 (1976) and W. B. Gogarty et al, Trans., AIME, 243, 1407 (1968) note that salt has a marked effect on the phase behavior of microemulsions prepared with petroleum sulfonates.

The effect of cosurfactant on phase behavior has also been discussed in a variety of papers:

R. N. Healy et al, Soc. Pet. Eng. J., 14, 491 (1974).
W. B. Gogarty et al, Trans. AIME 243, 1407 (1968).
J. L. Salager, et al, SPE Preprint No. 7054 presented at the Fifth Symposium on Improved Methods of Oil Recovery, Tulsa, April 1978.
S. C. Jones et al, Soc. Pet. Eng. J., 16, 161 (1976).
K. D. Dreher et al, J. Pet. Tech. 23, 1437 (1971).
P. B. Lorenz et al, SPE Preprint No. 4751 presented at the Third Improved Oil Recovery Symposium, Tulsa (1974).

The cosurfactants modify phase behavior and other physical properties of brine-hydrocarbon-surfactant systems. Changes in the molecular weight of cosurfactants can be quite important in determining phase behavior and physical properties. S. J. Salter, SPE. Preprint No. 6843, 52nd Annual Fall Meeting of the SPE, Denver, October 1977, teaches that there is a linear relationship between optimal salinity and alcohol content. Many surfactants have been taught to be useful. For example, see U.S. Pat. No. 3,254,714, issued to W. B. Gogarty et al; U.S. Pat. Nos. 3,506,070 and 3,613,787 to S. C. Jones; U.S. Pat. No. 3,997,451 issued to M. A. Plummer et al, and U.S. Pat. No. 3,888,309 to J. S. Rhudy et al.

Changes in composition change various physical and chemical characteristics of micellar dispersions. Thus, viscosity is regulated through controlling the amount of water in U.S. Pat. No. 3,275,075 issued to W. B. Gogarty et al. The concentration of water-soluble salts is used as a viscosity control in U.S. Pat. No. 3,330,343 issued to W. C. Tosch et al. The thermostability range of microemulsions is adjusted by:

(a) changes in the ratio of surfactant to hydrocarbon in U.S. Pat. No. 3,493,047 issued to J. A. Davis, Jr. et al,
(b) increasing the concentration of cosurfactant within the microemulsion in U.S. Pat. No. 3,493,048 issued to S. C. Jones,
(c) increasing the aromaticity of the hydrocarbon within the microemulsion in U.S. Pat. No. 3,495,660 issued to J. A. Davis, Jr. et al,
(d) increasing the average molecular weight of the surfactant used to form the microemulsion in U.S. Pat. No. 3,500,912 issued to J. A. Davis, Jr. et al,
(e) increasing the molecular weight of cosurfactant in U.S. Pat. No. 3,536,136 to S. C. Jones.

Higher brine tolerances are obtained by using lower average equivalent weight surfactants and lower brine tolerances are obtained by increasing the average equivalent weight of the surfactant in U.S. Pat. No. 3,623,553 issued to D. N. Burdge. The hydrophil-lipophil balance is controlled to obtain desired formation rock wettability in U.S. Pat. No. 3,643,738 issued to K. D. Dreher et al. Stability at higher temperatures is increased by including in the microemulsion a cation which has a greater affinity for the petroleum sulfonate used to make up the micellar dispersion than the affinity of the cation within the interstitial water of the reservoir in U.S. Pat. No. 3,648,770 issued to R. D. Sydansk et al.

U.S. Pat. No. 3,687,201 to M. O. Son, Jr. et al teaches the control of the viscosity of an oil external microemulsion system by using relatively low average equivalent weight petroleum sulfonates to obtain relatively high viscosity microemulsions and relatively high average equivalent weight petroleum sulfonates to obtain decreased viscosities. The topic is generally discussed by L. A. Wilson, Jr. in the chapter, "Physical-Chemical Environment of Petroleum Reservoirs in Relation to Oil Recovery Systems" in the book, *Improved Oil Recovery by Surfactant and Polymer Flooding*, supra, p. 47. The use of various polymers in micellar polymers in micellar-polymer flooding is taught in many of the cited patent and literature references and several chapters of the cited Shaw et al book are directed to this subject.

There are other patents directed to additional aspects of slug design. These include, U.S. Pat. No. 3,307,628 issued to E. A. Sena, teaching a combination of oil and water soluble surfactants; U.S. Pat. No. 3,433,636 to W. B. Gogarty, teaching the desired mobility parameters for a slug; U.S. Pat. No. 3,476,184 to J. A. Davis, Jr. teaching modification of the composition and character of the microemulsion from front to back to control slug hydrophilicity; U.S. Pat. No. 3,507,331 to S. C. Jones wherein increased concentrations of some components are included within the leading edges of the microemulsion slug to insure stability; U.S. Pat. No. 3,976,582 to L. J. Douglas et al wherein Zeta potential is utilized for controlling or obtaining maximum oil recovery and U.S. Pat. No. 4,022,276 issued to K. D. Dreher wherein nuclear magnetic resonance measurements are used to obtain microemulsions designed to obtain maximum oil recovery.

Even when all of the implicit and explicit teachings of the large amount of art sampled above are considered, those skilled in the art find it quite difficult to design an optimum slug or other micellar system for use in oil recovery. This fact is confirmed by the recent failures of field tests of micellar-polymer floods where improper slug design and/or insufficient reservoir studies combined to insure failure.

The references cited above indicate some of the many approaches to micellar dispersions taken in the past. A plethora of other literature could be cited relative to other aspects of oil recovery using microemulsions and other forms of micellar flooding. However, the current state of the art relating to the design of a specific micellar system for a specific reservoir is summarized by G. L. Stegemeier, supra, p. 55, who states, > Literature related to the subject is large and yet incomplete, since the mechanisms are complicated by interrelated properties of complex pore structure, fluid properties and applied conditions. Furthermore, the variability of oil reservoir rocks and fluids is so great that the most generalized conclusions have limited applicability.

With reference to surfactant-flood systems made up of surfactant, water, oil, electrolyte, cosurfactant, etc., the state of the art may have been more succinctly summarized by Messrs. Walker and Ray of the University of Florida, Tham of the USERDA Bartlesville Energy Research Center and M. C. Lee of the Department of Chemical Engineering, Oklahoma State University, in their article, "Cation Exchange, Surfactant Precipitation, and Adsorption in Micellar Flooding", Symposium on Chemistry of Oil Recovery presented before the Division of Petroleum Chemistry, Inc., American Chemical Society, Anaheim Meeting, Mar. 12–17, 1978, wherein it was summarized.

> It is commonly known that the constituents of a micellar slug may interact in several ways with both the rock and the formation fluids when injected into a reservoir, and a considerable body of literature exists. In spite of this knowledge, however, it is not yet possible to design a micellar slug for tertiary oil recovery from basic principles because of the complexity of the phenomena and of inadequate understanding of the processes involved.

The above indicates that the divergent courses taken by those skilled in the art as well as the chemistry and physics of the fluid-reservoir interaction may have served to obscure the pathway to inexpensive, effective slug design. The instant method will assist in remedying the problem.

SUMMARY OF THE INVENTION

The method of slug design of this invention is carried out after the usual preliminary reservoir and economic checks have been made. Assuming predetermined criteria are met, the method of this invention is used to develop micellar dispersions, preferably microemulsions, for use in oil recovery operations. In the method of this invention, tentative micellar dispersions are then prepared from the available and economic surfactants, usually petroleum sulfonates, and cosurfactants where needed using, for example, the HLB method. The stability of the micellar dispersion is then determined. Microemulsions will preferably solubilize approximately equal amounts of crude oil and water from the reservoir. Filterability tests are run to determine the facility with which the prospective micellar dispersions pass through filters approximating the average pore size of the reservoir rock.

At this point, floods are conducted using large slugs of micellar dispersions in reservoir-simulating cores to determine the amounts of fluids displaced by the slug. Next, core floods are run using small slugs to establish the slug-size-to-oil-recovery ratio of each of the suite of slugs being tested. Finally, floods using slugs of intermediate size are carried out to determine the ultimate oil recovery ability of the slug to be propagated and the adequacy of the polymer solution selected to propagate the slug. The micellar-polymer system having the highest efficiency with respect to cost is then used in the oil recovery operation.

SPECIFIC DESCRIPTION OF THE INVENTION

While the process is useful in designing floods using dilute aqueous surfactant, soluble oil, multiphase systems, etc., micellar and single phase microemulsions, the specific description of the invention will be primarily in terms of the more complex, more successful and more widely tested micellar-polymer flood design.

The term micellar dispersions is intended to encompass, for example, micellar flooding with systems of the type taught by H. J. Hill, J. Reisberg, and G. L. Stegemeier, J. Pet. Tech., 186 (1973) Feb., wherein relatively dilute aqueous "solutions" of surfactant and/or cosurfactant are injected, the process of R. L. Reed et al, U.S. Pat. No. 3,885,628 wherein a multiphase system is injected and U.S. Pat. No. 3,082,822 issued to L. W. Holm et al, wherein substantially small slugs of anhydrous soluble oils are alternately injected with small slugs of water or other aqueous media.

After the suitability of a reservoir for secondary-type oil recovery using microemulsions has been established, a suite of potentially good microemulsion compositions is formulated using techniques known to those skilled in the art. From this suite of compositions, the optimum microemulsion is determined and formulated. The microemulsion may be oil or water external or intermediate, having some of the characteristics of both oil external and water external systems. The microemulsions used in the method of this invention are preferably water external, or intermediate. Microemulsions are also known as micellar dispersions, micellar solutions, fine emulsions, and water-containing soluble oils. The microemulsions and their components and characteristics are further described in the above-listed patents to Davis, Gogarty, Jones, Schroeder, and others.

Properties of the microemulsions are preferably determined under simulated reservoir conditions using reservoir cores and fluids, but in many cases are determinable under ambient laboratory conditions. The stability is preferably determined in terms of cosurfactant concentration where a cosurfactant is to be used. The composition and temperature of the reservoir fluids and reservoir material, rock or sand, determines, to some extent, the character of the particular surfactant and cosurfactant used. Thus, higher equivalent weight surfactant and/or cosurfactant will be required where the crude oil is paraffinic than where the crude contains a substantial amount of aromatics. Greater than average amounts of surfactant and cosurfactant will be required where the crystalline structure of the reservoir provides greater than average surface area or where significant amounts of clay are present.

The method of this invention is applicable to formulations using various types of surfactants and, where necessary, cosurfactants, salts, acids and bases under conditions known to the art. Petroleum sulfonates are preferred and surfactants for forming microemulsions and should have an average equivalent weight of 325–550; more preferably 375–450, and most preferably 390–440. Lower molecular weight surfactants can be used in aqueous surfactant flooding. Cosurfactants are preferably the partially water soluble alkyl and/or aromatic alcohols, the ethoxylated alcohols are also useful because of the fine water solubility gradations obtainable.

Optionally, the interfacial tensions of the microemulsions are determined when in contact with the reservoir fluids and the aqueous mobility controlling drive fluids. The mobility of the microemulsion will be preferably adjusted to be no more than that of the combined mobility of the reservoir fluids and the viscosity of the microemulsion will be established to the right side of the viscosity peak graphed when increasing amounts of alcohol are added to the microemulsion being studied. Desired microemulsion mobility can be obtained by changing the hydrocarbon, surfactant, cosurfactant and salt or salts or the concentrations of one or more of these microemulsion components.

The filterability of each of the microemulsions is determined using Millipore filters, diatomaceous earth, and/or core plugs of the reservoir rock. Filterability is important, particularly at the well face where plugging can occur from the presence of gelatinous material such as ferrous hydroxides or solids such as rust or polymer particles or wax in the microemulsion.

Preferably the microemulsion will solubilize at least about as much oil as brine under reservoir conditions. If a cosurfactant is needed, the formulation should contain a cosurfactant type and concentration which will produce this result. This result can be accomplished by determining the minimum amount of cosurfactant required to solubilize the microemulsion components into a microemulsion and the maximum amount of alcohol which can be incorporated in the microemulsion. Where a relatively water-insoluble cosurfactant concentration is too low, the microemulsion will solubilize too little crude and where it is too high, too little water will be solubilized. The reverse is true with relatively water-soluble cosurfactants. Another approach to solubility determination is to add excessive but equal amounts of crude and reservoir water to the microemulsion and determine how much of each is solubilized. The microemulsion composition is adjusted to effect approximately equal solubilization of reservoir crude and brine. It is best to adjust the surfactant or the equivalent weight of the surfactant being used but easiest to change cosurfactant or cosurfactant concentration. Changes in the salt concentration can also be made.

When the phase studies are completed to determine approximately optimum microemulsions, cores are flooded with the microemulsions to determine the specific microemulsion to be used in the actual reservoir. In the next step in determining the optimum composition each of the microemulsions is used to flood resevoir cores or core plugs which have been saturated with resevoir fluids to simulate the secondary or tertiary condition of the reservoir. One large slug (50–150 PV and preferably about 100%) displacement is conducted for each of the microemulsion compositions and an analysis is made of the shapes of the cumulative-oil-production versus pore-volumes-injected curves.

Figure 1:
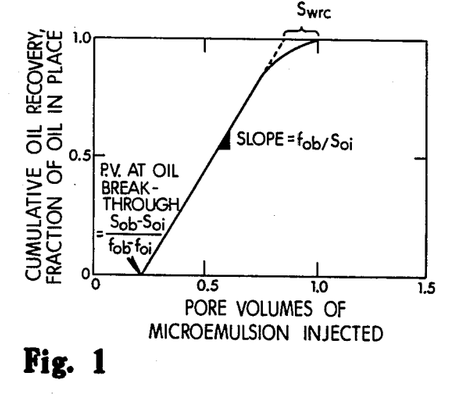
FIG. 1 depicts flood behavior when residual water remains.

FIGS. 1 through 4 illustrate the four types of displacement behavior obtained. FIG. 1 depicts cumulative oil recovery behavior when the continuously-injected microemulsion leaves residual water ($S_{wrc}$). The slope of the portion of the curve just after oil bank breakthrough is equal to the ratio of fractional flow of oil in the oil bank to the initial oil saturation Extrapolation of the straight line portion of the curve shows that complete oil recovery would occur before one pore volume throughput, indicating that the microemulsion displaces all the oil it contacts, but leaves residual water.

In such a displacement, nearly all the oil is recovered prior to the injection of one pore volume of fluid. However, the slug is hydrophobic and does not mobilize all of the interstitial water. The composition of the slug may have to be changed to make it more hydrophilic or, alternately, the properties of the slug may be modulated from relatively hydrophobic at the leading edge of the slug to relatively hydrophilic at the trailing edge of the slug. If there is no modulation, the slug may not interact well with the mobility-controlling drive fluid. When the microemulsion and the aqueous polymer drive fluid do not interact well, there can be a high surfactant loss because a portion of the microemulsion phase will not be mobilized by the drive fluid. The desired modulation can be accomplished with lower equivalent wieght surfactant, more water-soluble alcohol, or reduction of the ion concentration of the microemulsion or drive fluid make-up water.

The behavior shown in FIG. 1, however, can also be due to an inordinately high salt concentration (particularly, a high divalent cation concentration) in the reservoir water. The concentration causing such behavior will depend on the surfactant and/or cosurfactant or the equivalent weights of each or reservoir temperature. If this is the case, the salinity of the microemulsion make-up water and particularly that of the drive fluid must be reduced proportionately. The microemulsion formulation may also have to be reformulated by other means to obtain the desired hydrophilicity or changes in hydrophilicity from front to back.

In FIGS. 1–4, the fraction of the pore volume injected at oil bank breakthrough is given by the ratio of the difference between the oil bank oil saturation ($S_{ob}$) and the initial oil saturation ($S_{oi}$) to the difference between the oil bank fractional flow of oil ($f_{ob}$) and the initial oil fractional flow ($f_{oi}$).

Figure 2:
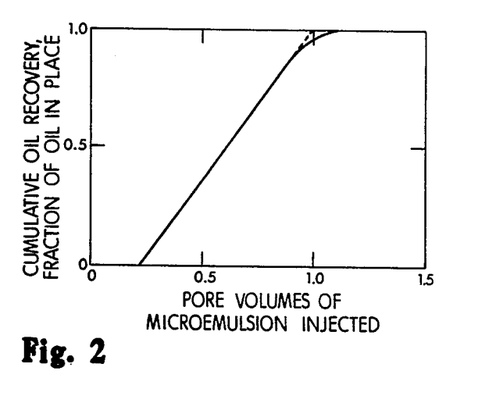
FIG. 2 depicts flood behavior wherein all fluids are displaced.

In FIG. 2, Curve, the extrapolated oil recovery is complete at one pore volume throughput indicating that the microemulsion displaces all fluids ahead of it. This microemulsion is likely to be a composition of choice and to require little or no further adjustment.

Figure 3:
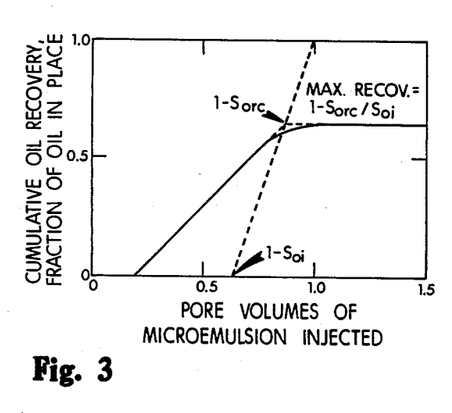
FIGS. 3 and 4 depict flood behavior wherein residual oil remains.
Figure 4:
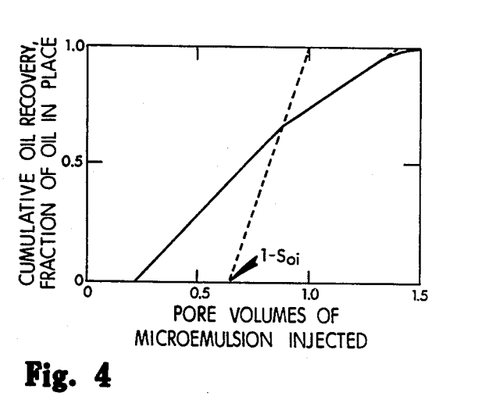

FIGS. 3 and 4 illustrate displacements in which the microemulsion leaves residual oil. Interpretation of these curves is aided by extending a dashed line from complete recovery at one pore volume to a value corresponding to 1-$S_{oi}$. ($S_{oi}$ represents the initial oil saturation prior to injection of the microemulsion.) A straight line extrapolation of the early portion of FIG. 3 intersects the dashed line at the point of theoretical microemulsion breakthrough if dispersion were to be absent. If no further oil is mobilized behind the microemulsion front, recovery will not increase to a value greater than that at the intersection point. The maximum oil recovery is then given by 1-$S_{orc}/S_{oi}$. ($S_{orc}$ represents the average oil saturation remaining at the conclusion of the micellar/polymer flood.)

The straight line extrapolation of the curve of FIG. 4 intersects the dashed line at the theoretical microemulsion breakthrough. However, recovery continues to increase after the point of intersection, indicating continued oil mobilization some distance behind the leading edge of the microemulsion slug. This condition can result from excessive loss from the leading edge of the slug of the fraction of surfactant which preferentially solubilizes oil.

Curves 3 and 4 represent a condition of too high microemulsion/oil interfacial tension. Unless there are compelling economic or practical reasons to do otherwise, these microemulsions should be made more oleophilic using surfactant which solubilizes little water or low watersolubility cosurfactant.

The major characteristics of various microemulsions in the presence of reservoir oil, water, and rock are readily determined by the use of a large slug. Furthermore, the analysis with a large slug is simplified by the lack of complicating factors resulting from the interaction of microemulsion and drive polymer solution and the absence of complicating effects resulting from unfavorable mobility between polymer drive fluid and microemulsion slug.

Determination of the adequacy of the mobility control between the microemulsion and oil bank may be determined by analysis for surfactant in the produced fluids. Premature surfactant breakthrough indicates that the microemulsion needs to be less mobile. This technique can be conducted with less than 100% PV slugs, for example, with slugs as small as about 50% PV if the mobility of a drive fluid is carefully monitored. There is little need to conduct core floods with an excess of 150% PV microemulsion.

The drive fluids used in the process of this invention are those described in the literature. These vary from emulsions to aqueous solutions of various biopolymers and synthetic polymers. The preferred drive fluids are aqueous solutions of partially hydrolyzed polyacrylamides or polysaccharide biopolymers having a mobility at least as low as that of the microemulsion.

Preferably the large slug floods should be followed by the injection of a mobility buffer fluid interaction behavior is most easily observed in a large slug displacement. This observation is effected through differential pressure measurements and composition measurements and phase distribution observation of effluent fluid samples.

Microemulsion and drive fluid incompability is sometimes evidenced by premature breakthrough of microemulsion and/or drive fluid. If the microemulsion-polymer solution mixing increases mobility at the interface, the higher mobility product formed will finger through the microemulsion and fluids in the reservoir and early breakthrough of polymer and surfactant can be noted. If the incompatibility causes surfactant and/or polymer deposition, the amount of oil displaced will be reduced. Microemulsion and drive fluid compatibility can also be determined by routine checks in vitro without using simulated reservoir floods. The microemulsion and drive fluid are mixed and the viscosity and/or surfactant and/or drive fluid components precipitated are determined.

In the next step in the design procedure, one or more microemulsion floods are conducted beginning with small slug sizes, as low as 1% PV or less, and increasing up to about 3% PV or more. Oil recovery versus slug size curves are then drawn for each micellar-polymer system being investigated. Multiple small floods detail the initial slope of the graphed curve. Obviously the higher slopes are the more desirable. Finally, intermediate floods, 5–15% PV, are performed using the slugs having the highest slopes from the small PV slug screening.

Figure 5:
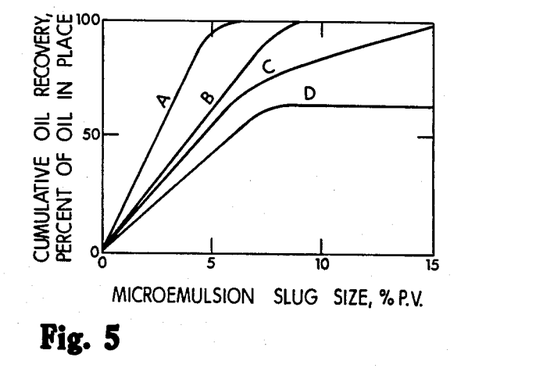
FIG. 5 depicts oil-recovery vs slug-size behavior curves.

FIG. 5 depicts four characteristic curves of oil-recovery versus slug-size behavior. Curve A represents a very efficient system that is capable of displacing all of the oil. It is characterized by a straight line throughout all but the highest slug size range (approaching 100% recovery). The fact that 100% oil recovery is achievable indicates that the microemulsion has adequate affinity for oil. The linearity of the lower portion of the curves suggests that the oil recovery is controlled by surfactant retention. That is, a small slug recovers oil efficiently until all the surfactant is immobilized by being retained on the rock surface. Injecting a larger slug results in proportionately more oil recovery because the surfactant can traverse a correspondingly larger portion of the core before it is completely deposited on the surface of the core.

The microemulsion of Curve B is effective in displacing oil but suffers from higher surfactant retention and requires a correspondingly larger slug size to achieve a given oil recovery. Curve C is characteristic of a microemulsion that is capable of displacing all the oil but suffers from either inadequate mobility control or excessive permeability heterogeneity in the reservoir rock. Its performance can be improved by increasing the microemulsion slug viscosity or polymer concentration or by increasing the size of the mobility buffer or combinations of these changes.

Curve D indicates that the microemulsion/polymer system has inadequate oil-displacing capability regardless of slug size, indicating the surfactant or cosurfactant is excessively water soluble. The microemulsion must be altered to obtain a lower crude oil/microemulsion interfacial tension. The previous, large-slug floods should have eliminated microemulsions evidencing this type of behavior.

The intermediate slug-size floods provide additional information regarding economics to that provided by the previously described, small-slug flooding step. It is preferable to conduct the large slug flood initially, conduct at least one small slug flood next, and then conduct one or more intermediate floods to determine the curves with some precision.

The purpose of the large slug flood is to insure the selection of slugs having minimal interfacial tension with reservoir crudes and high ultimate displacement efficiency.

The small floods provide information as to which of the micellar dispersion and drive fluid combinations interact best to propagate the effective surfactant species. The large and small slug floods essentially provide the answer to whether the proper type and concentration of slug and drive fluid components are present. The intermediate slug provides the answer to whether there is sufficient polymer and whether the problems of fluid flow instabilities are solved.

While the invention has been described in terms of a sereis of flooding operations, it is obvious that both micellar slug and fluid drive systems can be modified between each of the flooding operations to improve the micellar dispersions and drive fluids and thereby reduce the total number of flooding operations to arrive at an optimum design or provide additional certainty of the best final flooding system.

With dilute surfactant systems the size of the small and intermediate slugs must be increased to compensate for the lower surfactant concentration. The size of the slug used in the test floods will increase as the concentration of surfactant in the slug decreases.

The same result can also be carried out by conducting the very small, the intermediate and the very large floods at once or in some other sequence with the suite of micellar dispersions to be tested and picking out the best slug. The process can also be used to design systems for well stimulation, etc., and the slug criteria required for those purposes. Those variations in the described process which are obvious to those skilled in the art are intended to fall within the appended claims.

The above-described process reduces appreciably the time and cost of slug design by eliminating the construction of pseudo-ternary diagrams and reducing the number of floods that must be conducted.

Now having described my invention, what I claim is:

1. In a process of designing micellar-drive fluid systems of controlled mobility for oil recovery operations in an oil-bearing reservoir having injection means and production means in fluid communication with said reservoir wherein the reservoir is evaluated taking into account the characteristics of the reservoir comprising the composition of the crude oil and the reservoir water and the temperature of the reservoir, to determine its suitability for oil recovery operations using micellar dispersions as the oil displacing medium, the reservoir fluids are characterized and a micellar-drive fluid system is designed using laboratory-sized secondary-type oil recovery floods in material simulating the reservoir, micellar dispersion slugs of appropriate size and drive fluid, the steps comprising:

(a) formulating a plurality of micellar dispersion slugs from components suitable for oil displacement in the reservoir to be flooded;

(b) conducting at least one flood in material simulating the reservoir using a large slug of micellar dispersion of each formulated micellar dispersion from which a micellar dispersion is to be selected to determine those micellar dispersion formulations which displace oil well;

(c) conducting at least one flood using a combination of the small slugs of micellar dispersion formulations which displace oil effectively and drive fluid in material simulating the reservoir to determine the oil-recovery-to-slug-size ratio of each of the micellar dispersions being tested;

(d) conducting at least one flood in material simulating the reservoir using intermediate-sized slugs of each of the micellar dispersions having a high oil-recovery-to-slug-size ratio and drive fluid to select an optimum micellar dispersion-drive fluid system.

2. The process of claim 1 wherein the micellar dispersion is a microemulsion and the drive fluid is an aqueous polymer solution.

3. The process of claim 2 wherein a graph of a cumulative oil-production versus pore volume injected is prepared for each of: (1) the large slug floods of step (b) and the curve of each of the graphs is compared with predetermined criteria to determine the properties, comprising the oil displacement effectiveness, of each of the microemulsions used in the floods; (2) oil recovery versus slug size of the small slug floods of step (c) and the curve of each graph is compared with predetermined criteria to establish the effective slug size of each microemulsion flooded; (3) and the graphs of oil recovery versus slug size are extended using the data from the intermediate slug floods of step (d) and the graphed curve of each flood is compared with predetermined criteria to determine the most economic slug by comparing the microemulsion slug-drive fluid cost with the value of the oil recovered.

4. The process of claim 2 wherein the large slug floods of step (b) are carried out with about 50 to about 150% PV microemulsion, the small slug floods of step (c) are carried out utilizing the slug sizes of about 1 to about 3% PV and the intermediate slug floods of step (d) are conducted with slugs of about 5 to about 15% PV of the reservoir material being flooded.

5. The process of claim 2 wherein the floods of steps (b), (c) and (d) are conducted in reservoir cores and with reservoir fluids at reservoir temperatures.

6. The process of claim 1 wherein a graph of a cumulative-oil-production versus oil-pore-volume injected is prepared for each of the large slug floods of step (b) and the curves of the graphs are compared with predetermined criteria to determine properties, comprising the oil displacement effectiveness, of each of the micellar dispersions used in the floods.

7. The process of claim 1 wherein a graph of oil recovery versus slug size is prepared for each of the small slug floods of step (c) and the curve of each graph is compared with predetermined criteria to establish the effective slug size of each micellar dispersion flooded.

8. The process of claim 1 wherein a graph of oil recovery versus slug size is prepared for the intermediate slug floods of step (d) and the graphed curve of each flood is compared with predetermined criteria to determine the most economic slug by comparing the micellar dispersion slug cost with the value of the oil recovered.

9. The process of claim 1 wherein a graph of cumulative oil-production versus pore volume injected is prepared for each of the large slug floods of step (b) and the curves of the graphs are compared with predetermined criteria to determine the properties, comprising the oil displacement effectiveness of each of the micellar dispersions used in the floods; a graph of oil recovery versus slug size is prepared for each of the small slug floods of step (c) and the curve of each graph is compared with predetermined criteria to establish the optimum slug size of each micellar dispersion flooded; and an extension of each of the small slug graphs of oil recovery versus slug size is prepared for each intermediate slug flood of step (d) and the graphed curve of each slug is compared with predetermined criteria to determine the most economic slug by comparing the micellar dispersion slug-drive fluid cost with the value of the oil recovered.

10. The process of claim 1 wherein the large slug floods of step (b) are carried out with about 50 to about 150% PV micellar dispersion, the small slug floods of step (c) are carried out utilizing the slug sizes of about 1 to about 3% PV and the intermediate slug floods of step (d) are conducted with slugs of about 5 to about 15% PV of the reservoir material being flooded.

11. The process of claim 1 wherein the floods of steps (b), (c) and (d) are conducted in reservoir cores with reservoir fluids at reservoir temperature.

12. In a process of conducting oil recovery operations in an oil-bearing reservoir having injection means and production means in fluid communication with said reservoir wherein the reservoir is evaluated taking into account the characteristics of the reservoir; comprising the composition of the crude oil and the reservoir water and the temperature of the reservoir; to determine its suitability for oil recovery operations using micellar dispersion as the oil-displacing medium and the reservoir fluids are characterized and a micellar dispersion-drive fluid system is designed using laboratory-sized oil recovery floods in material simulating the reservoir with micellar dispersions and drive fluid slugs of appropriate size to determine the optimum micellar dispersion for flooding the reservoir, the steps comprising:

(a) formulating a plurality of micellar dispersion slugs from components suitable for oil displacement in the reservoir to be flooded;

(b) conducting at least one flood in material simulating the reservoir using a very large slug of micellar dispersion of each micellar dispersion of a suite of suitable micellar dispersions from which a micellar dispersion is to be selected to determine the better oil displacing micellar dispersion formulations, (c) conducting at least one flood using small slugs of those better oil displacing formulations and drive fluid in material simulating the reservoir to determine the oil-recovery-to-slug-size ratio of each of the micellar dispersions tested;

(d) conducting at least one flood in material simulating the reservoir using intermediate-sized micellar dispersion slugs and displacement fluid to establish an optimum micellar dispersion-drive fluid system.

(e) injecting into reservoir sufficient of the optimum micellar dispersion-drive fluid system to displace oil from the injection means toward the production means.

13. The process of claim 12 wherein the micellar dispersion is a microemulsion.

14. The process of claim 12 wherein the drive fluid is an aqueous polymer solution.

15. The process of claim 12 wherein a graph of the cumulative-oil-production versus oil-pore-volume injected is prepared for each of the large slug floods of step (b) and the curves of the graphs are compared with predetermined curve criteria to determine the properties comprising the oil displacement effectiveness of each of the micellar dispersions used in the floods.

16. The process of claim 12 wherein the large slug floods of step (b) are carried out with about 50 to about 150% PV microemulsion, the small slug floods of step (c) are carried out utilizing slug sizes of about 1 to about 3% PV and the intermediate slug floods of step (d) are conducted with slugs of about 5 to about 15% PV of the reservoir material being flooded.

17. The process of claim 12 wherein the floods of steps (b), (c) and (d) are conducted under simulated reservoir conditions.

18. The process of claim 17 wherein the micellar dispersion is a water external microemulsion.

19. The process of claim 12 wherein a graph of oil recovery versus slug size is prepared for each of the small slug floods of step (c) and the curve of each graph is compared with predetermined criteria to establish the effective slug size of each micellar dispersion flooded.

20. The process of claim 22 wherein a graph of recovery versus slug size is prepared for the intermediate slug floods of step (d) and the graphed curve of each flood is compared with predetermined criteria to determine the most economic slug by comparing the micellar dispersion slug cost with the value of the oil recovered.

21. The process of claim 12 wherein the micellar dispersion is a microemulsion and a graph of the cumulative-oil-production versus pore-volume-injected is prepared for each of: (1) the large slug floods of step (b) and the curves of each of the graphs is compared with predetermined criteria to determine the properties, comprising the oil displacement effectiveness, of each of the microemulsions used in the floods; (2) oil recovery versus slug size of each of the small slug floods of step (c) and the curve of each graph is compared with predetermined criteria to establish the effective slug size of each microemulsion flooded; and (3) the oil recovery versus slug size graphs are extended using the data from the intermediate slug floods of step (d) and the graphed curve of each flood is compared with predetermined criteria to determine the most economic slug by comparing the microemulsion-drive fluid system costs with the value of the oil recovered.

22. In a process of designing micellar-drive fluid systems of controlled mobility for oil recovery operations in an oil-bearing reservoir having injection means and production means in fluid communication with said reservoir wherein a reservoir is evaluated taking into account the characteristics of the reservoir comprising the composition of the crude oil and the reservoir water and the temperature of the reservoir, to determine its suitability for oil recovery using a micellar dispersion as the oil displacing medium, the process comprising:

(a) analyzing reservoir fluids to determine characteristics comprising mobility, hardness, and composition;

(b) formulating a plurality of micellar dispersion slugs from surfactants and other components suitable for oil displacement in the reservoir to be flooded, determining the properties of the micellar dispersion comprising interfacial tension and stability in contact with the reservoir fluids, filterability and mobility;

(c) selecting a suite of micellar dispersions having good stability when in contact with the reservoir fluids, mobility at least as low as that of the combined mobilities of the reservoir fluids, minimal interfacial tension and good filterability;

(d) conducting at least one fluid of each of the micellar dispersions in material simulating the reservoir using a large slug of micellar dispersion of each of the selected micellar dispersions to determine those micellar dispersions which displace oil well;

(e) conducting at least one flood each of the micellar dispersion formulations using small slugs which displace oil well and displacing fluid in materials simulating the reservoir to determine the oil-recovery-to-slug-size ratio of each of the micellar dispersions being tested; and (f) conducting at least one flood of each of the micellar dispersions providing a high oil-recovery-to-slug-size-ratio in material simulating the reservoir using intermediate-size micellar dispersion slugs and displacement fluid to select an optimum micellar dispersion-drive fluid system.

23. The process of claim 22 wherein the floods are conducted in reservoir cores using reservoir fluids at reservoir temperatures.

24. The process of claim 22 wherein the micellar dispersion is a microemulsion and the drive fluid is an aqueous polymer solution.

25. In a process for conducting oil recovery operations is an oil-bearing reservoir having injection means and production means in fluid communication with said reservoir wherein the reservoir is evaluated taking into account the characteristics of the reservoir comprising the composition of the crude oil, the composition of the reservoir water and the temperature of the reservoir; to determine its suitability for oil recovery using microemulsions as the oil-displacing media and wherein the reservoir fluids are analyzed to determine characteristics comprising mobility and hardness and a microemulsion-drive fluid system is designed using laboratory-sized oil recovery floods in materials simulating the reservoir with microemulsions and drive fluid slugs of appropriate size to determine the optimum microemulsion for flooding the reservoir, the steps comprising:

(a) formulating a plurality of microemulsion slugs from components suitable for oil displacement in the reservoir to be flooded;

(b) analyzing the microemulsion slugs to determine characteristics comprising stability, mobility and interfacial tension;

(c) selecting those slugs which are relatively stable when in contact with the reservoir fluids, which have a mobility at least as low as the combined mobility of the fluids in the reservoir and which have minimal interfacial tension;

(d) conducting floods using the best microemulsions from among the emulsions analyzed in step (b) in materials simulating the reservoir using a large slug of each of the selected microemulsions to determine those formulalations which displace oil well;

(e) conducting at least one flood using each small slug of those formulations which displace oil best in step (d) and drive fluid in materials simulating the reservoir to determine the oil-recovery-to-slug-size ratio of each of the microemulsions being tested;

(f) conducting at least one flood in materials simulating the reservoir using intermediate-sized microemulsion slugs and displacement fluid systems found to displace oil best in step (d) to establish an optimum microemulsion-drive fluid system;

(g) injecting into the reservoir sufficient of the optimum microemulsion-drive system to displace the oil from the injection means toward the production means.

26. In the process of claim 25 the carrying out of the laboratory-sized oil recovery floods in reservoir cores containing reservoir fluids.

27. In a process of designing micellar-drive fluid systems for secondary-type oil recovery operations, the steps comprising:

(a) evaluating a reservoir to determine properties comprising fluid permeability, crude oil content and properties, aqueous fluid-composition and properties, the mobility of the crude oil and aqueous reservoir fluid;

(b) comparing the properties of the reservoir with predetermined criteria to determine the suitability of the reservoir for secondary-type oil recovery operations using micellar-polymer flooding;

(c) when the reservoir meets the predetermined criteria that would be the minimum predetermined criteria for successful secondary-type oil recovery operations, formulating a plurality of micellar dispersion slugs from surfactants and other components suitable for oil displacement in the reservoir to be flooded;

(d) determining the properties of the micellar dispersion comprising stability in contact with the reservoir fluids, filterability, mobility and interfacial tension when in contact with reservoir fluids;

(e) selecting a suite of micellar dispersions having good stability when in contact with reservoir fluids, minimal interfacial tension and good filterability;

(f) conducting at least one flood of each of the selected micellar dispersions in materials simulating the reservoir using a large slug of micellar dispersions to determine those micellar dispersions which meet predetermined criteria for the displacement of oil;

(g) conducting at least one flood of each of the micellar dispersion formulations which meet the criteria of oil displacement using small slugs and displacing fluid in materials simulating the reservoir to determine the oil-recovery-to-slug-size ratio of each of the micellar dispersions being tested;

(h) conducting at least one flood of each of the micellar dispersions providing a high oil-recovery-to-slug-size ratio in materials simulating the reservoir using intermediate sized miscellar dispersion slug and displacement fluid to select an optimum micellar dispersion-drive fluid system.

28. In a process of using micellar-drive fluid systems for secondary-type oil recovery operations, the steps comprising:

(a) evaluating a reservoir to determine properties comprising fluid permeability, crude oil content and properties, aqueous fluid-composition and properties, the mobility of the crude oil and aqueous reservoir fluid;

(b) comparing the properties of the reservoir with predetermined criteria to determine the suitability of the reservoir for secondary-type oil recovery operations using micellar-polymer flooding;

(c) when the reservoir meets the predetermined criteria that would be the minimum predetermined criteria for successful secondary-type oil recovery operations, formulating a plurality of micellar dispersion slugs from surfactants and other components suitable for oil displacement in the reservoir to be flooded;

(d) determining the properties of the micellar dispersion comprising stability in contact with the reservoir fluids, filterability, mobility and interfacial tension when in contact with reservoir fluids;

(e) selecting a suite of micellar dispersions having good stability when in contact with reservoir fluids, minimal interfacial tension and good filterability;

(f) conducting at least one flood of each of the selected microemulsions in materials simulating the reservoir using a large slug of micellar dispersion of each to determine those micellar dispersions which meet predetermined criteria for the displacement of oil;

(g) conducting at least one flood of each of the micellar dispersion formulations which meet the criteria of oil displacement using small slugs and displacing fluid in materials simulating the reservoir to determine the oil-recovery-to-slug-size ratio of each of the microemulsions being tested;

(h) conducting at least one flood of each of the microemulsions providing a high oil-recovery-to-slug-size ratio in materials simulating the reservoir using intermediate-sized micellar dispersion slug and displacement fluid to select an optimum microemulsion dispersion-drive fluid system;

(i) and injecting into the reservoir sufficient of the selected optimum micellar dispersion-drive fluid system to displace oil from the injection means toward the production means.

29. In a process of designing micellar-drive fluid systems of controlled mobility for oil recovery operations in an oil-bearing reservoir having injection means and production means in fluid communication with said reservoir wherein the reservoir is evaluated taking into account the characteristics of the reservoir comprising the composition of the crude oil and the reservoir water and the temperature of the reservoir, to determine its suitability for oil recovery operations using micellar dispersions as the oil displacing medium, the reservoir fluids are characterized and a micellar slug-drive fluid system is designed using laboratory-sized secondary-type oil recovery floods of appropriate size and drive fluid are conducted in material simulating the reservoir, micellar dispersions, the steps comprising:

(a) formulating a plurality of micellar dispersion slugs from components suitable for oil displacement in the reservoir to be flooded, which micellar dispersions solubilize at least about as much oil as brine under reservoir conditions;

(b) conducting at least one flood in material simulating the reservoir using a large slug of micellar dispersion of each formulated micellar dispersion from which a micellar dispersion is to be selected to determine the cumulative-oil-production versus pore-volumes-injected data;

(c) modifying the compositions of the formulations having the better cumulative-oil-production versus pore-volumes-injected to impart predetermined characteristics to the formulations by adjusting the concentration and/or type of components within any micellar dispersions requiring modifications;

(d) conducting at least one flood using each combination of drive fluid and small slugs of micellar dispersion formulations which have the predetermined criteria or which have been modified to have the predetermined criteria in materials simulating the reservoir to determine the oil-recovery-to-slug-size ratio of each of the micellar dispersion and drive fluid systems; and (e) modifying the micellar dispersions and/or the drive fluid so that each of the systems tested approximates predetermined optimum criteria and;

(f) conducting at least one flood in material simulating the reservoir using intermediate-sized micellar dispersion slugs of each of the optimized micellar dispersion-drive fluid systems meeting predetermined optimum criteria or modified to meet predetermined optimum criteria to select the optimum micellar dispersion-drive fluid system for flooding a reservoir.

30. The process of claim 29 wherein the micellar dispersion is a microemulsion and the drive fluid is an aqueous polymer solution.

31. The process of conducting oil recovery operations in an oil-bearing reservoir having an injection means and a production means in fluid communication with said reservoir wherein the reservoir is evaluated taking into account the characteristics of the reservoir comprising the composition of the crude oil and the reservoir water and the temperature of the reservoir to determine its suitability for oil recovery operations using micellar dispersions as the oil-displacing medium and the reservoir fluids are characterized and micellar dispersion-drive fluid systems are designed using laboratory-sized oil recovery floods in material simulating the reservoir with micellar dispersions and drive fluid slugs of appropriate size to determine the optimum system of micellar dispersion and drive fluid for flooding the reservoir, the steps comprising:

(a) formulating a plurality of micellar dispersion slugs from components suitable for oil displacement in the reservoir to be flooded, which micellar dispersions solubilize at least about as much oil as brine under reservoir conditions;

(b) conducting at least one flood in material simulating the reservoir using a large slug of micellar dispersion of each formulated micellar dispersion from which a micellar dispersion is to be selected to determine the cumulative-oil-production versus pore-volumes-injected data;

(c) modifying the compositions of the formulations having the better cumulative-oil-production versus pore-volumes-injected to impart predetermined characteristics to the formulations by adjusting the concentration and/or type of components within any micellar dispersions requiring modifications;

(d) conducting at least one flood using each combination of drive fluid and small slugs of micellar dispersion formulations which have the predetermined criteria or which have been modified to have the predetermined criteria in materials simulating the reservoir to determine the oil-recovery-to-slug-size ratio of each of the micellar dispersion and drive fluid systems; and (e) modifying the micellar dispersion and/or the drive fluid so that each of the systems tested approximates predetermined optimum criteria and;

(f) conducting at least one flood in material simulating the reservoir using intermediate-sized micellar dispersion slugs of each of the optimized micellar dispersion-drive fluid systems meeting predetermined optimum criteria to select the optimum micellar dispersion-drive fluid system for flooding a reservoir.

(g) injecting into the reservoir sufficient amounts of optimum micellar dispersion-drive fluid system to displace reservoir fluids from the injection means toward the production means.

32. The process of claim 31 wherein the micellar dispersion is a microemulsion and the drive material is an aqueous polymer solution.

* * * * *

UNITED STATES PATENT AND TRADEMARK OFFICE
CERTIFICATE OF CORRECTION

PATENT NO. : 4,206,809
DATED : June 10, 1980
INVENTOR(S) : Stanley C. Jones

It is certified that error appears in the above-identified patent and that said Letters Patent are hereby corrected as shown below:

| | |
|---|---|
| Col. 5, line 41: | Following "preferred" delete "and". |
| Col. 6, lines 29 & 31: | Delete "resevoir" and insert --reservoir-- at both occurrences. |
| Col. 6, line 63: | Delete "wieght" and insert --weight--. |
| Col. 8, line 11: | Following "fluid" insert --The microemulsion/mobility buffer--. |
| Col. 11, line 67: | Following "into" insert --the--. |
| Col. 12, line 32: | Delete "22" and insert --12--. |
| Col. 13, line 37: | Delete "is" and insert --in--. |
| Col. 13, line 68: | Delete "formulalations" and insert --formulations--. |
| Col. 14, line 1: | Delete "(c)" and insert --(e)--. |
| Col. 14, line 23: | Delete "fluid-composition" and insert --fluid--composition--. |
| Col. 14, lines 47-48: | Following "large slug of micellar" delete "dispersions" and insert --dispersion--. |
| Col. 14, line 68: | Delete "fluid-composition" and insert --fluid--composition--. |

Signed and Sealed this

Twelfth Day of May 1981

[SEAL]

Attest:

RENE D. TEGTMEYER

Attesting Officer

Acting Commissioner of Patents and Trademark